(12) United States Patent
Cheng

(10) Patent No.: US 6,387,164 B1
(45) Date of Patent: May 14, 2002

(54) HOUSING FOR ELECTRONIC AIR CLEANER

(75) Inventor: Fun Kong Cheng, Singapore (SG)

(73) Assignee: Airwave PTE LTD, Singapore (SG)

( * ) Notice: Subject to any disclaimer, the term of this patent is extended or adjusted under 35 U.S.C. 154(b) by 0 days.

(21) Appl. No.: 09/391,921

(22) Filed: Sep. 9, 1999

(30) Foreign Application Priority Data

Sep. 10, 1998 (SG) .......................................... 9803598-3
Apr. 29, 1999 (SG) .......................................... 9901911-9

(51) Int. Cl.$^7$ ................................................ B03C 3/82
(52) U.S. Cl. ............................... 96/66; 55/356; 55/422; 55/480; 55/483; 55/DIG. 31
(58) Field of Search ........................ 96/15, 66, 57–59, 96/94; 55/356, 422, 480, 483, 484, 493, 495, 506, 507, DIG. 31; 261/DIG. 41

(56) References Cited

U.S. PATENT DOCUMENTS

| | | | | | |
|---|---|---|---|---|---|
| 2,992,701 | A | * | 7/1961 | White | .................... 55/DIG. 31 |
| 3,504,482 | A | * | 4/1970 | Goettl | ...................... 55/493 X |
| 3,626,668 | A | * | 12/1971 | Cardiff | ..................... 55/493 X |
| 4,031,180 | A | * | 6/1977 | Bohanon | ................ 55/DIG. 31 |
| 4,498,913 | A | * | 2/1985 | Tank et al. | ................ 55/422 X |
| 5,059,218 | A | * | 10/1991 | Pick | .......................... 55/493 X |
| 5,679,121 | A | * | 10/1997 | Kim | ........................ 55/493 X |
| 5,690,719 | A | * | 11/1997 | Hodge | ....................... 55/495 X |
| 5,797,975 | A | * | 8/1998 | Davis | .......................... 55/493 |
| 5,863,310 | A | * | 1/1999 | Brown et al. | ............. 55/493 X |
| 5,944,860 | A | * | 8/1999 | Mack et al. | ........... 55/DIG. 31 |
| 6,030,427 | A | * | 2/2000 | Sorice et al. | ............. 55/493 X |

* cited by examiner

*Primary Examiner*—Richard L. Chiesa
(74) *Attorney, Agent, or Firm*—Perman & Green, LLP

(57) ABSTRACT

An electronic air cleaner assembly (1) for attachment to an air handling unit AHU (2) of an air-conditioning system has a housing (10) containing a plurality of electrostatic filter cells (20). One side wall (11) of the housing (10) is pivotally mounted to a side (5) of the AHU (2) by hinges (30) and the opposite side wall (12) is releasably attached to the opposite wall (6) of the AHU (2) by a releasable locking device (42,44). Wheels (46) are provided on the housing (10) to assist in moving it from a closed position to an open position which allows access to the heat exchanger coil(s) (4) of the AHU (2). The electrostatic filter cells (20) may be readily removed either through the open front face or through one of the walls of the housing (10) for checking and maintenance.

1 Claim, 8 Drawing Sheets

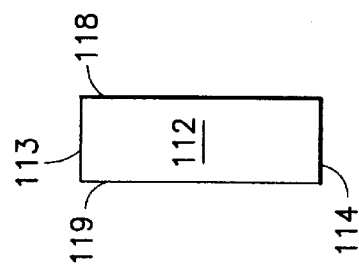
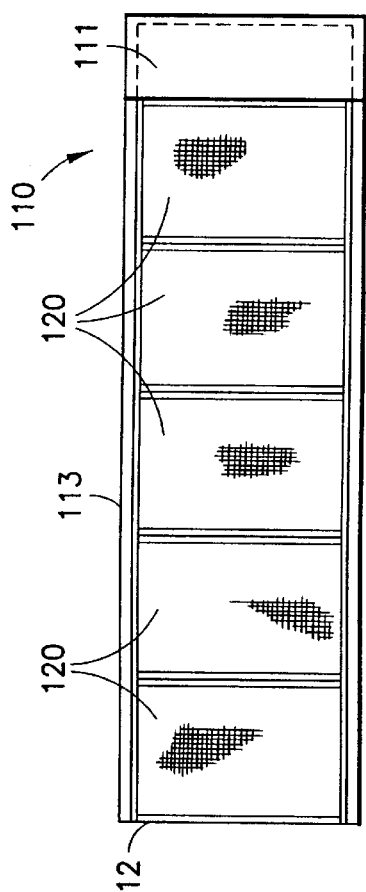
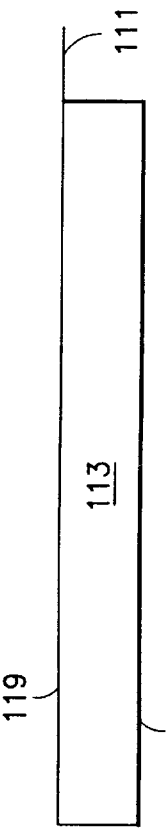
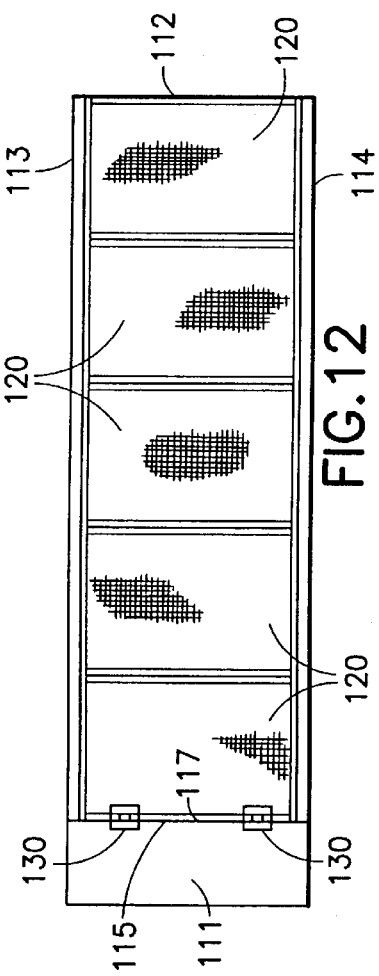
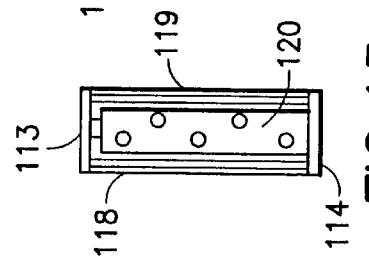

HOUSING FOR ELECTRONIC AIR CLEANER

TECHNICAL FIELD OF THE INVENTION

The present invention relates to electronic air cleaners and is particularly concerned with providing an improved housing for an electronic air cleaner.

BACKGROUND ART

Electronic air cleaners are used in air-conditioning systems for cleaning the air passing through the system before it enters a room or space requiring conditioned air. Electronic air cleaners generally comprise a unit containing a number of oppositely charged collecting plates and a series of electrically heated wires. As air is drawn through the unit passed the heated wires, small airborne particles of pollutants require an electrical charge, and the charged particles are then attracted to the charged collecting plates. The types of pollutant collected to the plates may include small particles of dirt, dust, smoke pollen, bacteria and grease. An electronic air cleaner may also include a pre-filter or screen which captures larger particles of pollutants before they enter the electrostatic unit.

Electronic air cleaners are usually discrete units which may be installed in the ducts of an air-conditioning system. More often, however, the discrete electronic air cleaner units are permanently secured to the front of an air handling unit which includes heat exchangers in the form of evaporator and/or condenser coils for heating and/or cooling the air as it passes through the air handling unit. Electronic air cleaners are generally manufactured in only a limited range of sizes. Often it is necessary to secure to an air handling unit a larger electronic air cleaner than is necessary for the unit. Further, factory made electronic air cleaners can be of a bulky construction as the space in rooms containing air handling units is often restricted. Such electronic air cleaners can take up a large amount of the restricted space within an air-conditioning room. Further, electronic air cleaning units permanently secured to an air handling unit can make it difficult to access the interior of the air handling unit for maintenance or service of the heat exchangers and other parts of the air handling unit.

It is therefore desirable to provide an electronic air cleaner assembly for attachment to an air handling unit and which allows ready access to the heat exchangers of the air handling unit.

It is also desirable to provide an electronic air cleaner housing of a simple and relatively inexpensive construction which can be manufactured in various sizes for different types of air handling units.

It is further desirable to provide an electronic air cleaner assembly in which electrostatic filter parts of the assembly can be readily removed for cleaning maintenance or replacement.

SUMMARY OF THE INVENTION

According to one aspect of the present invention there is provided an electronic air cleaner housing for attachment to an air handling unit of an air-conditioning system, wherein the housing is adapted to contain a plurality of electrostatic filter cells, and the housing includes means for detachably mounting the housing to a face of an air handling unit, wherein the housing is at least partly detachable from the air handling unit to allow access to the interior of the air handling unit.

Preferably, one side of the electronic air cleaner housing is adapted to be pivotally mounted to one side of the air handling unit, and an opposite side of the housing is connectable to the opposite side of the air handling unit by releasable attachment means. At least one hinge means is preferably provided for pivotally mounting said one side of the housing to the air handling unit. The releasable attachment means preferably comprises at least one locking member mounted on said opposite side of the housing for engagement with a complementary locking member mounted on the air handling unit.

When the electronic air cleaner housing is pivotally mounted on an air handling unit, the housing can be opened like a door from a closed position in which it is securely retained on the face of the air handling unit by the releasable attachment means and an open position in which the opposite side of the housing is detached from the air handling unit to allow access to the interior of the air handling unit. In one preferred embodiment, at least one roller means, such as a wheel or roller, is mounted on a lower wall of the housing to assist in moving the housing between its closed and opened positions.

In accordance with another advantageous feature of the present invention, the housing has opposed side walls, an upper wall and a lower wall, the housing defining at least one compartment for receiving a plurality of removable electrostatic filter cells. Preferably, the housing has at least one partition defining a plurality of compartments within the housing for receiving the removable electrostatic filter cells.

According to another aspect of the invention, there is provided an electronic air cleaner housing having first and second side walls, an upper wall and a lower wall defining at least one compartment for containing a plurality of electrostatic filter cells, the housing being so constructed and arranged as to allow removal of the electrostatic filter cells after mounting in the at least one compartment. In one preferred embodiment, the housing has open front and/or rear faces such that electrostatic filter cells mounted in the at least one compartment are removable from the front or rear of the housing.

Preferably, the housing has at least one horizontally extending partition defining upper and lower compartments for receiving upper and lower rows of removable electrostatic filter cells.

The compartments of the housing preferably have spring-loaded retaining means for retaining the electrostatic filter cells in the compartments. The spring-loaded retaining means are preferably provided on members mounted to the at least one horizontally extending partition and to the upper and/or lower wall of the housing.

The electrostatic air cleaner housing may also include water drainage channels for draining away water used in washing the electrostatic filter cells. Preferably, the water drainage channels are provided on the lower wall of the housing and on the upper surface of the at least one horizontally extending partition. In this case, the power supply units for the electrostatic filter cells are preferably separate units which can be housed in a wall panel in the air-conditioning room containing the air handling units together with the control panel of a building management system for the air-conditioning system.

In another preferred embodiment, at least one of the walls of the housing can be opened to allow insertion or removal of the electrostatic filter cells from the side of the housing or from above or below the housing.

In accordance with a further aspect of the invention, there is provided an electrostatic air cleaner assembly comprising a housing in accordance with any one of the previously described aspects of the invention and a plurality of removable electrostatic filter cells mounted in the housing.

BRIEF DESCRIPTION OF THE DRAWINGS

A preferred embodiment of the present invention will now be described, by way of example only, with reference to the accompanying drawings in which:

FIG. 10 is a front view of a modified electronic air cleaner housing in accordance with another aspect of the invention;

FIG. 11 is a top plan view of the housing of FIG. 10;

FIG. 12 is a rear view of the housing of FIG. 10;

FIG. 13 is a view from one side of the housing of FIG. 10;

FIG. 14 is a view from the other side of the housing of FIG. 10;

DESCRIPTION OF PREFERRED EMBODIMENT

Figure 1:
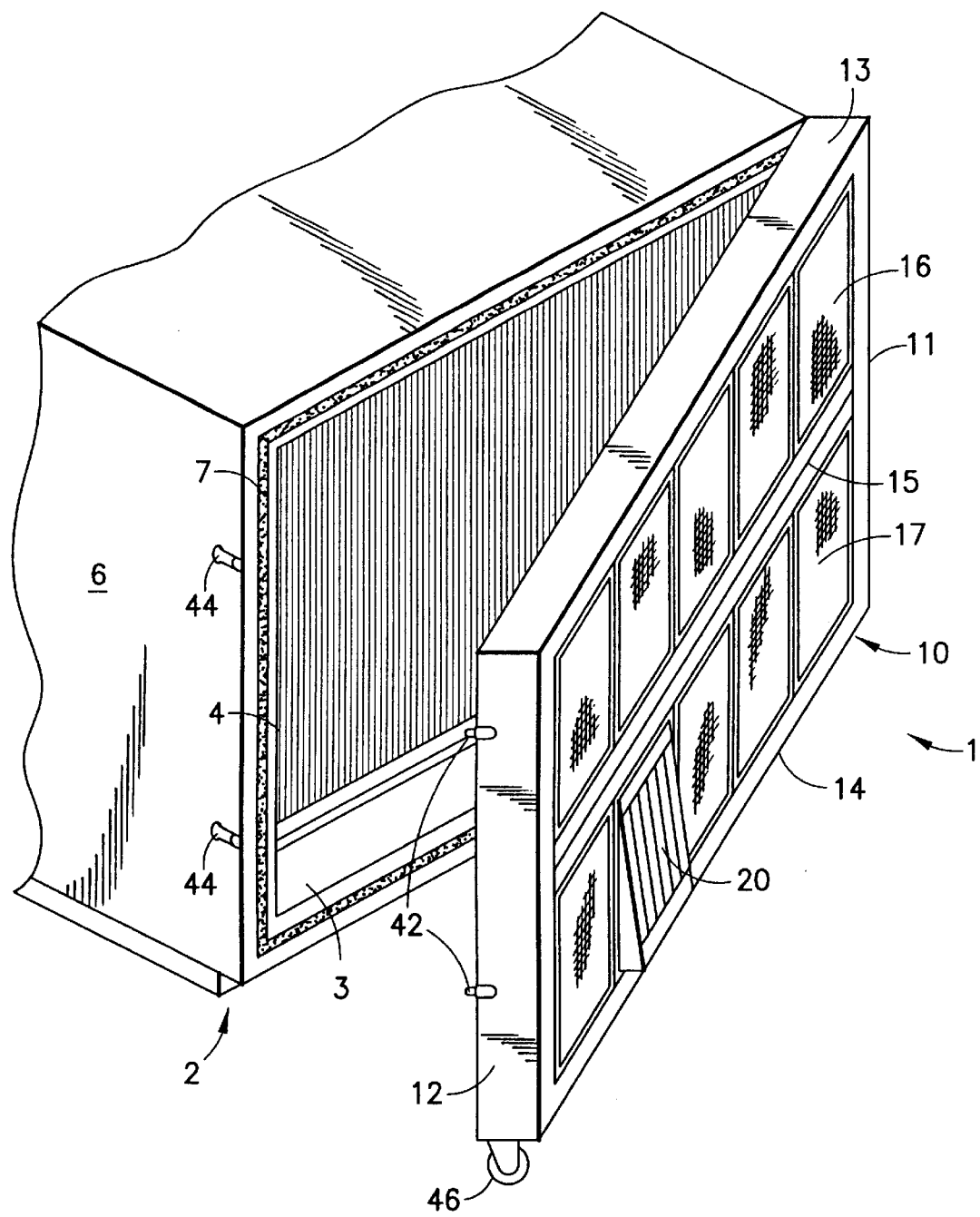
FIG. 1 is a perspective view of an electronic air cleaner assembly in accordance with the invention detachably mounted to an air handling unit of an air-conditioning system.

Referring to FIG. 1, an electronic air cleaner assembly 1 in accordance with the invention is shown detachably mounted to the front face 3 of an air handling unit 2 which includes a heat exchanger 4 such as an evaporator or condenser coil for heating and/or cooling air as it passes through the air handling unit.

The electronic air cleaner assembly 1 comprises a housing 10 within which a plurality of electrostatic filter cells 20 are removably mounted. The housing has first and second side walls 11 and 12, upper and lower walls 13 and 14 and a substantially horizontally extending partition 15 which divides the housing into upper and lower compartments 16 and 17.

The walls of the housing and the horizontally extending partition are preferably formed from aluminum extrusions and, as such, are not subject to rust or corrosion requiring future replacement. It will, however, be appreciated that other materials may be used in the manufacture of the walls and partition of the housing 10.

Figure 3:
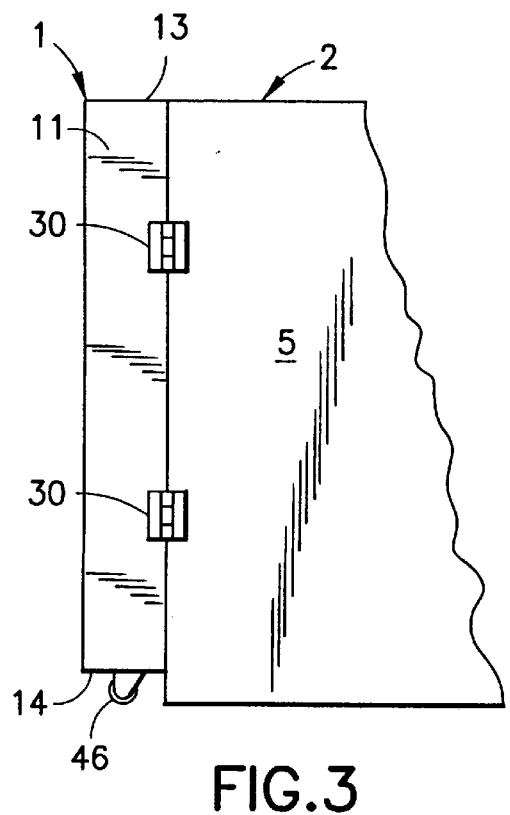
FIG. 3 is a view from one side of the electronic air cleaner assembly pivotally mounted to the air handling unit.

One side wall 11 of the housing is pivotally mounted to the front end of one side 5 of the air handling unit 2 by hinge means in the form of hinges 30. As shown in FIG. 3, two hinges 30 are provided although it will be appreciated that the number of hinges may vary for different sizes of electronic air cleaner assemblies 1 and air handling units 2. The opposite side wall 12 of the housing 1 is adapted to be connected to the opposite side wall 6 of the air handling unit 2 by releasable attachment means 40. The releasable attachment means preferably comprises one or more locking members 42, such as locking pins, mounted on the side wall 12 of the housing 10 for engagement with one or more complementary locking members 44, such as pin-receiving members, provided on the front end of the side wall 6 of the air handling unit 2. It will, however, be appreciated that different types of releasable attachment means may be used in the present invention.

Figure 2:
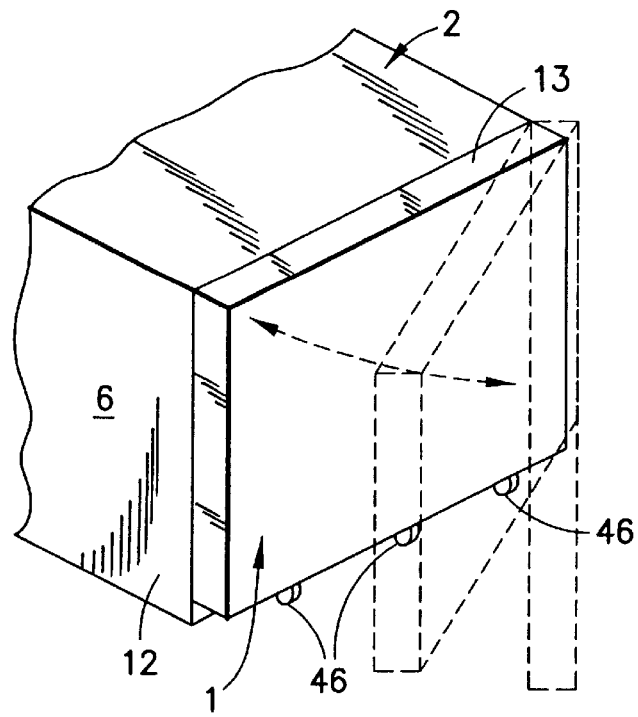
FIG. 2 is a schematic perspective view of the electronic air cleaner assembly showing movement between a closed position and an open position.

Referring to FIG. 2, it will be seen that the electronic air cleaner assembly is pivotally movable between a closed position (as illustrated in full lines in FIG. 2) in which the housing 10 is releasably attached to the front face 3 of the air handling unit 2, and one or more open positions (as illustrated in broken lines in FIG. 2) in which the side wall 12 is detached from the adjacent side 6 of the air handling unit 2. In order to assist this pivotal movement, one or more roller means, such as castor wheels 46 are mounted on the lower wall 14 of the housing 1. As shown in FIG. 1, a sealing gasket 7 is provided around the periphery of the front face of the air handling unit 2 to achieve an effective seal between the housing 10 and the air handling unit 2 in the closed position.

Figure 7:
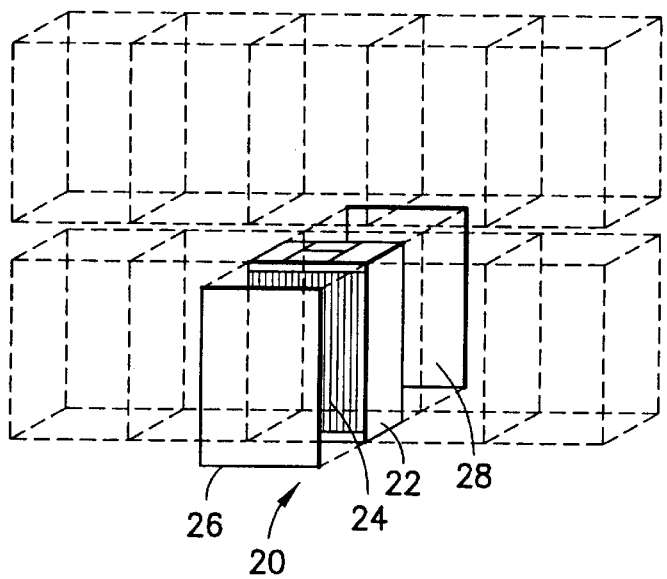
FIG. 7 is an exploded perspective view of an electrostatic filter cell of the assembly of FIGS. 1 to 5.

Referring more particularly to FIG. 7, each electrostatic filter cell 20 has a main rectangular body portion 22 containing a series of electrically heated wires 24 and oppositely charged collecting plates (not shown) extending substantially vertically within the rectangular body 22. A rectangular pre-filter 26, formed for example from fine mesh aluminum, is mounted on the front face of the rectangular body 22. A similar fine mesh backing plate 28 may be mounted on the rear face of the body 22 of the electrostatic filter cell 20.

Figure 5:
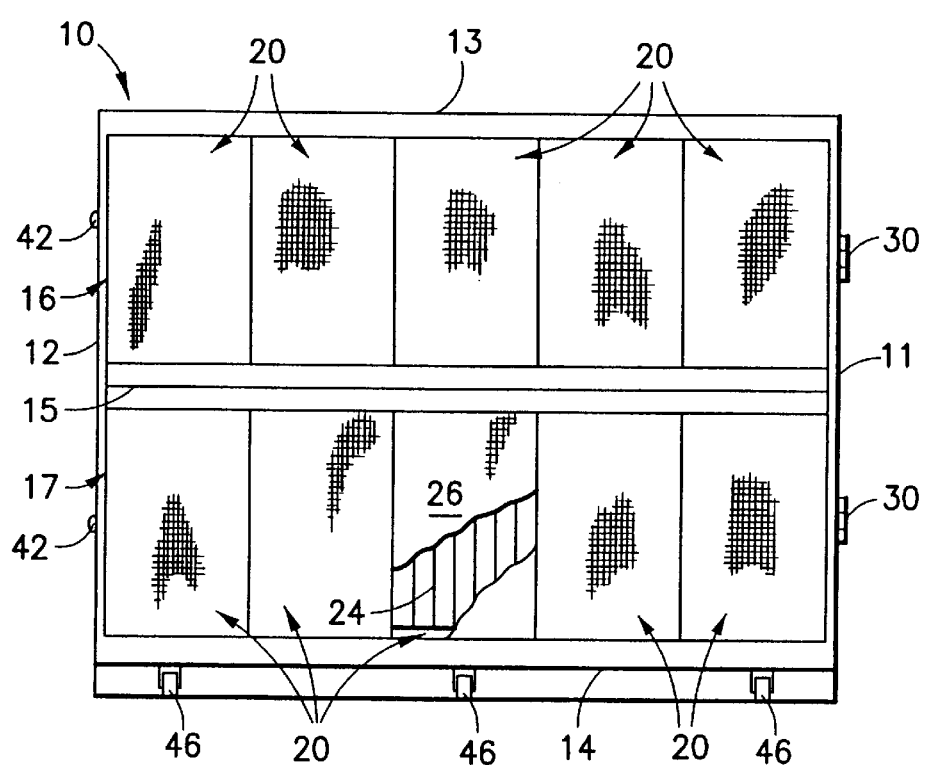
FIG. 5 is a front view of the electronic air cleaner assembly.
Figure 6:
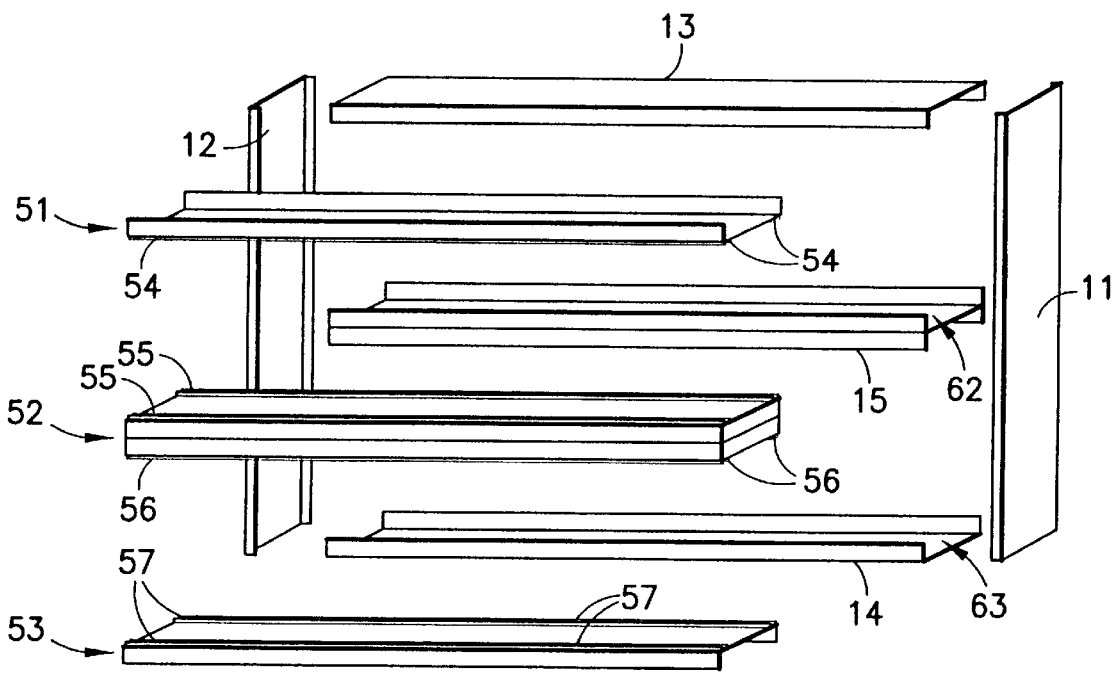
FIG. 6 is an exploded perspective view of the components of the electronic air cleaner housing.

As illustrated in FIGS. 1 and 5 and schematically in FIGS. 6 and 7, there are two rows of five electrostatic filter cells 20 received in the upper and lower compartments 16, 17 of the housing 10, although it will be appreciated that the number of electrostatic filter cells in the compartments may vary for different sizes of electronic air cleaners.

Figure 8:
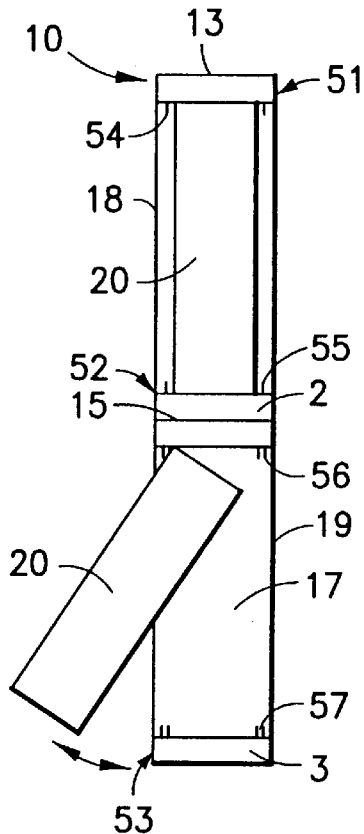
FIG. 8 is a schematic vertical section through the assembly showing the mounting for one of the removable electrostatic filter cells.
Figure 9:
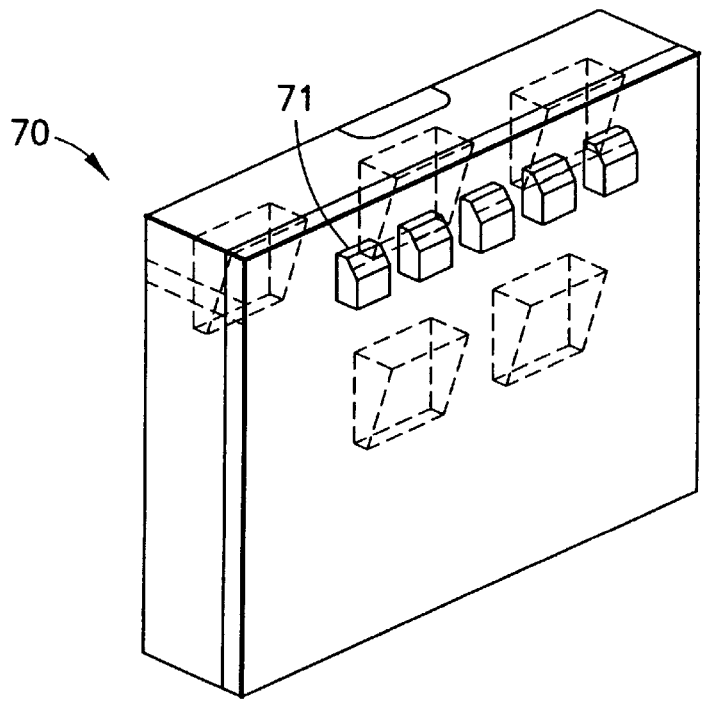
FIG. 9 is a perspective view of an electronic power supply for the electrostatic filter cells of the air cleaner assembly.

The housing 10 has substantially open front and rear faces 18 and 19 which enable the electrostatic filter cells to be removably mounted in the compartments 16, 17 from either the front or rear of the housing 10 as shown in FIGS. 6 and 8. The housing includes an upper retaining member 51, an intermediate retaining member 52 and a lower retaining member 53. The upper retaining member 51 is mounted to the upper wall 13 of the housing 10 and extends downwardly therefrom. The retaining member 51 has downwardly extending resilient projections 54 which assist in retaining the electrostatic filter cells 20 in the upper compartments. The intermediate retaining member 52 is adapted to fit over the horizontally extending partition 15 and has upwardly extending resilient projections 55 extending along its upper side edges and downwardly extending resilience projections 56 extending along its lower side edges. The lower retaining member 53 is mounted to the lower wall 14 of the housing 10 and has upwardly extending resilient projections 57 extending along its upper side edges. As shown in FIG. 8, an electrostatic filter cell 20 is adapted to be installed in one of the compartments 16, 17 of the housing 10 by pushing the filter cell 20 against the resilient retaining projections 54, 56 and pivoting the electrostatic cell 20 into position to be retained by the upwardly extending resilient projections 55, 57. The electrostatic filter cells are removable from the compartments 16, 17 in a similar operation performed in reverse.

As shown in FIG. 6, the lower wall 14 of the housing 10 and the partition 15 are channel-shaped having vertically extending sides and a horizontally extending base. The intermediate and lower retaining members 52 and 53 support the electrostatic filter cells above the respective bases of the partition 15 and lower wall 14, and the spaces therebetween form drainage channels 62, 63 for draining away water used in washing the electrostatic filter cells 20 in situ.

Figure 4:
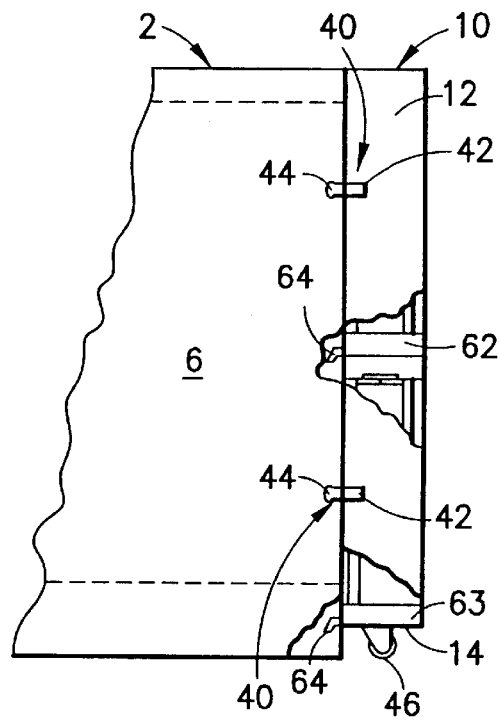
FIG. 4 is a view from the other side of the electronic air cleaner assembly showing the releasable attachment means of the housing.

As shown in FIG. 4, drainage spouts 64 may be provided for draining away water from the drainage channels 62, 63.

As the electrostatic filter cells 20 of the electronic air cleaner assembly 1 are intended to be washed in situ, one or more separate electrical power supply units 70 are provided for the electrostatic filter cells 20. This is in contrast to conventional electronic air cleaners in which the electrical power supply units are usually mounted directly on the electrostatic filter cells.

The power supply units 70 may include solid state performance indicators 71 and may conveniently be mounted and housed in a control panel for the building management system of the air-conditioning system which is usually mounted on a wall of the air-conditioning room containing the air handling unit 2.

The electronic air cleaner housing and assembly as described above has several advantageous features over conventional electronic air cleaners. The assembly can be manufactured, assembled and installed at a lower cost compared to conventional electronic air cleaners. The housing may be made to measure to suit the size of particular air handling units, thus achieving a better efficiency without over sizing. The assembly is quite slim in its construction and when detachably mounted on an air handling unit does not occupy much of the limited space available in an air-conditioning room where the air handling units are located. The detachable nature of the electronic air cleaner housing and assembly allows ready access to the interior of the air handling unit for easy maintenance of the evaporator and/or condenser cooling coils, which is necessary to be carried out once, twice or several times a year, depending on the activity in the building. The electrostatic filter cells may be simply removed from the front (or rear) of the housing 10, regardless of sequence. This facilitates checking and repair of the electrostatic filter cells. The drainage channels in the housing allow for washing of the electrostatic filter cells in situ, and the separately located electrical power supplies 70 remove the risk of electronic parts of the power supplies coming into contact with water when the electrostatic filter cells are washed.

Referring to FIGS. 10 to 14 there is shown a modified air cleaner assembly 100 in accordance with another aspect of the invention. The assembly 100 comprises an elongate substantially rectangular housing 110 and a plurality of removable electrostatic filter cells 120. The housing 110 has first and second side walls 111 and 112, upper and lower walls 113 and 114 and substantially open front and rear faces 118 and 119.

The housing 110 differs from the housing 110 of FIGS. 1 to 8 in that one of the side walls 111 can be opened to allow the electrostatic filter cells 120 to be mounted in and removable from the housing through the opened side wall 111 rather than from the front or rear of the housing 110. For this purpose, the rear side edge 115 of the side wall 111 is pivotally connected to an adjacent side edge 117 of the rear face 118 by one or more hinges 130. It will, however, be appreciated that the side wall 111 and/or the opposite side wall 112 may be connected to the remainder of the housing 110 by other means which allow the sidewall(s) 111, 112 to be opened.

Another difference between the housing 110 and the housing 10 of FIGS. 1 to 8 is that there is no partition in the housing 110, and the side walls 111, 112 and the upper and lower walls 113, 114 define a single elongate compartment for receiving the row of removable electrostatic filter cells 120 although it will be apparent that a housing with one or more horizontal partitions defining two or more compartments such as that of FIGS. 1 to 8 may be provided with a side wall or side walls which can be opened to allow insertion or removal of the electrostatic filter cells 120.

In FIGS. 15 to 19, there is shown another modified air cleaner assembly 200 in accordance with the invention. The assembly 200 also comprises an elongate substantially rectangular housing 210 which receives a plurality of removable electrostatic filter cells 220. The housing 210 has first and second side walls 211, 212, upper and lower walls 213, 214 and substantially open front and rear faces 218, 219.

Figure 15:
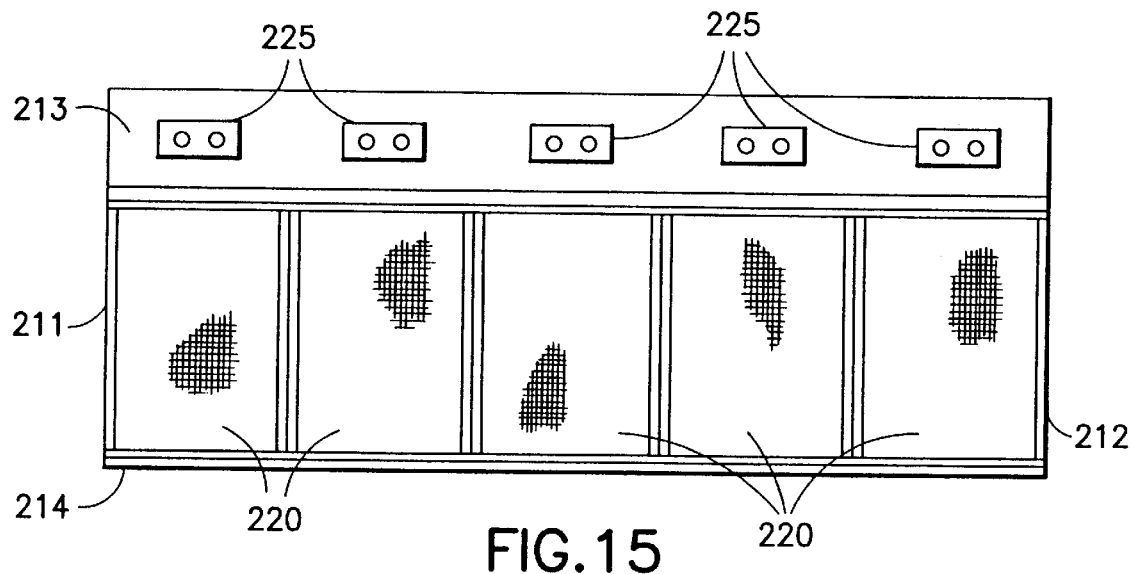
FIG. 15 is a front view of another modified electronic air cleaner housing in accordance with the invention.
Figure 16:
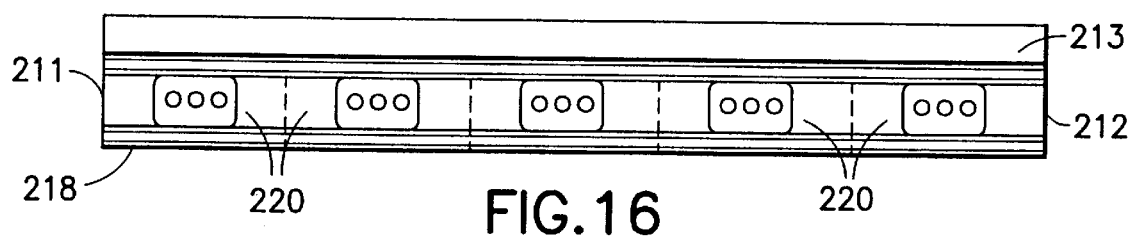
FIG. 16 is a top plan view of the housing of FIG. 15.
Figure 17:
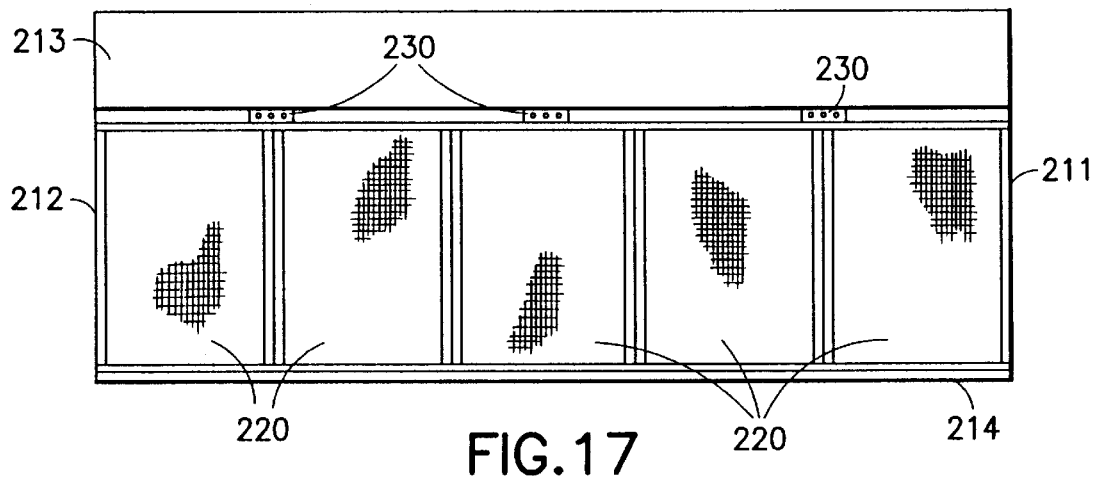
FIG. 17 is a rear view of the housing of FIG. 15.
Figure 18:
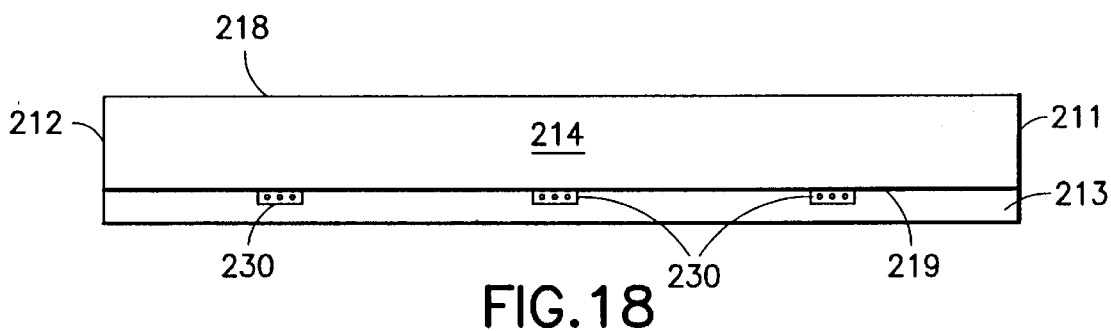
FIG. 18 is an underneath view of the housing of FIG. 15.
Figure 19:
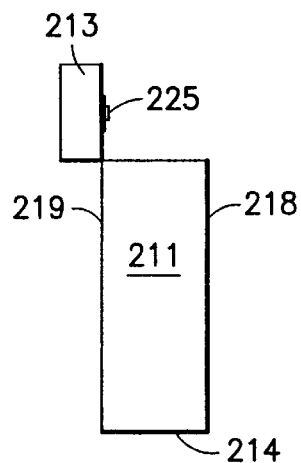
FIG. 19 is a side view of the housing of FIG. 15.

The housing 210 differs from the housing 110 of FIGS. 10 to 14 in that the upper wall 213 can be opened to allow the electrostatic filter cells 220 to be mounted in and removed from the housing 210 through the opened upper wall 213 instead of through a side wall 211, 212. For this purpose, the rear lower edge of the upper wall 213 is pivotally connected to the rear upper edge of the rear face 219 by one or more hinges 230. As shown in FIGS. 15 and 19, the upper wall 213 is in the form of a rectangular lid and may also incorporate electrical connections 225 for the removable electrostatic filter units 220.

It will also be appreciated that the size and form of the housing 210 may vary for different applications. For instance, it may also include one or more horizontal or vertical partitions defining two or more compartments for receiving rows and/or columns of removable electrostatic filter cells 220. In the case where a horizontal partition is provided, the lower wall 114 may also be opened to allow the electrostatic filtercells in the lower compartment to be inserted into or removed from the bottom of the housing.

The modified housings of FIGS. 10 to 14 and FIGS. 15 to 19 may incorporate means for pivotally attaching one side of the housing to the front of an air handling unit as in the embodiment of FIGS. 1 to 8.

It will be appreciated that various modifications may be made to the preferred embodiment described above without departing from the scope and spirit of the invention. For instance, the number of partitions, compartments and electrostatic filter cells contained within the compartments may be varied for different sizes of air handling units.

What is claimed is:

1. An electronic air cleaner housing for attachment to an air handling unit of an air-conditioning system, wherein the housing is adapted to contain a plurality of electrostatic filter cells and includes means for detachably mounting the housing to a face of an air handling unit, whereby the housing is at least partly detachable from the air handling unit to allow access to the air handling unit, wherein one side of the housing is adapted to be pivotally mounted to one side of the air handling unit, and an opposite side of the housing is connectable to the opposite side of the air handling unit by releasable attachment means, and wherein at least one roller means is mounted on a lower part of the housing to assist in moving the housing between a closed position in which it is mounted on the face of the air handling unit and an open position in which said opposite side of the housing is detached from the air handling unit to allow access to the air handling unit.

\* \* \* \* \*